United States Patent [19]

Elly et al.

[11] Patent Number: 4,928,194
[45] Date of Patent: May 22, 1990

[54] ANTI-STATIC SUPPORT FOR A CARTRIDGE IN A DISK DRIVE

[75] Inventors: James E. Elly, Rochester; Gerald J. Kosarko, Pavilion, both of N.Y.

[73] Assignee: Eastman Kodak Company, Rochester, N.Y.

[21] Appl. No.: 252,233

[22] Filed: Sep. 30, 1988

[51] Int. Cl.$^5$ ............................................. G11B 5/016
[52] U.S. Cl. ............................ 360/97.04; 360/99.02; 360/99.05; 360/133
[58] Field of Search ............... 360/97.02, 97.03, 97.04, 360/99.01, 99.02, 99.05, 97.01, 99.06, 99.12, 133, 137

[56] References Cited

U.S. PATENT DOCUMENTS

| | | | |
|---|---|---|---|
| 3,208,056 | 9/1965 | Pearson et al. | 360/99.01 |
| 3,532,932 | 10/1970 | Simon | 361/220 |
| 3,815,150 | 6/1970 | Stoddard | 360/99.05 |
| 4,038,693 | 7/1977 | Huffine et al. | 360/133 |
| 4,040,105 | 8/1977 | Slindee | 360/99.12 |
| 4,058,846 | 11/1977 | Knutson et al. | 360/121 |
| 4,071,854 | 1/1978 | Bijon et al. | 360/102 |
| 4,317,149 | 2/1982 | Elser et al. | 360/126 |
| 4,578,727 | 3/1986 | Hills | 360/102 |
| 4,620,250 | 10/1986 | Hills | 360/102 |
| 4,637,945 | 1/1987 | Masui et al. | 428/35 |
| 4,675,755 | 6/1987 | Baumeister et al. | 360/133 |
| 4,750,063 | 6/1988 | Kume et al. | 360/99.02 |

FOREIGN PATENT DOCUMENTS 3042446  6/1982  Fed. Rep. of Germany ... 360/99.05

Primary Examiner—John H. Wolff
Attorney, Agent, or Firm—David M. Woods

[57] ABSTRACT

A disk drive includes an anti-static plate held against a plastic jacket of a cartridge assembly for neutralizing the effect of a static electrical charge accumulated on the plastic jacket. The plate is particularly effective in connection with a magnetic interface in which aerodynamic forces must maintain a magnetic disk within the jacket in contact with a transducer. The plate includes an area that covers a substantial proportion of the jacket surface opposite to the side of the cartridge assembly through which the transducer extends.

4 Claims, 4 Drawing Sheets

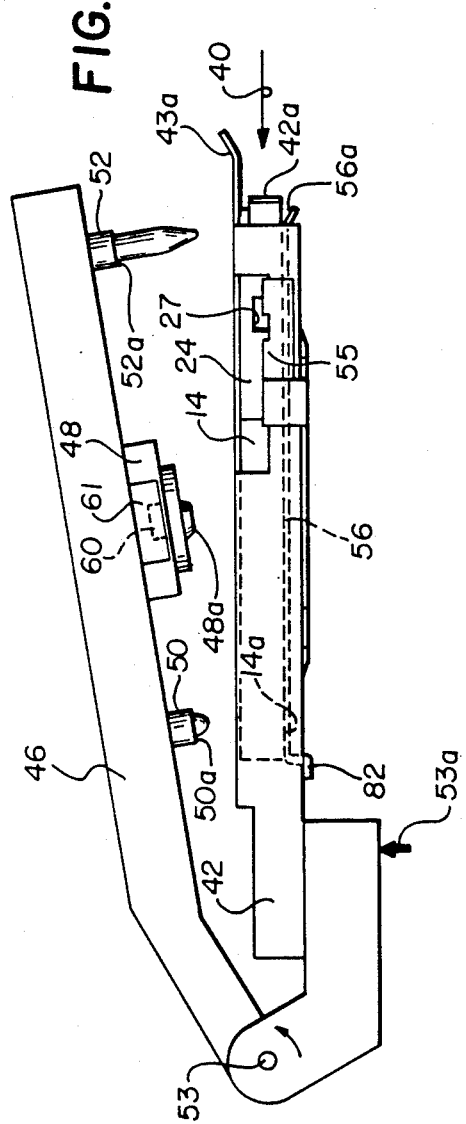
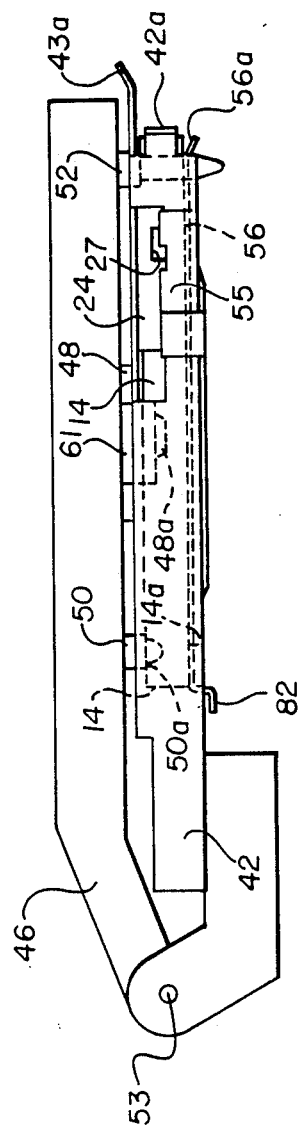
FIG. 2A
FIG. 2B

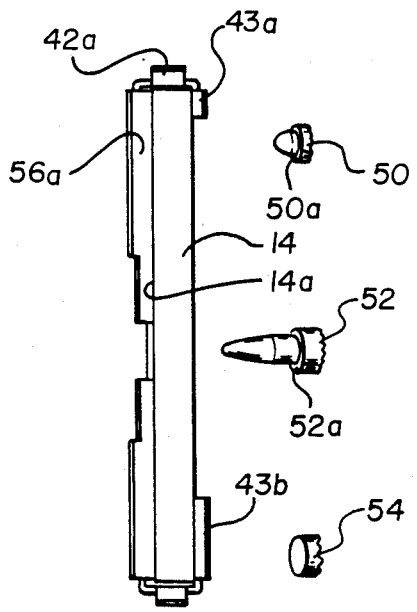
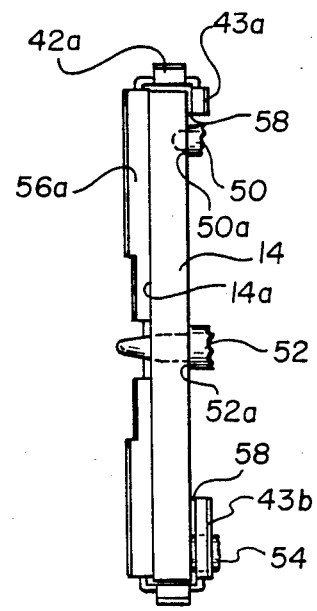
FIG. 3A          FIG. 3B
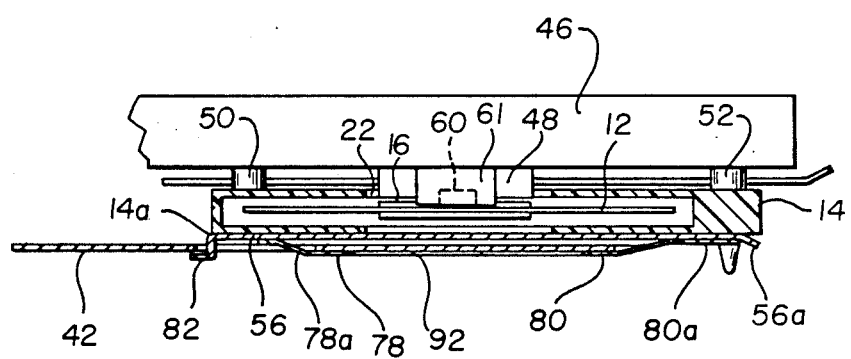
FIG. 5

ANTI-STATIC SUPPORT FOR A CARTRIDGE IN A DISK DRIVE

BACKGROUND OF THE INVENTION

1. Field of the Invention

This invention relates to a magnetic disk drive for a cartridge assembly including a magnetic disk, and, more particularly, to a disk drive capable of neutralizing or dissipating an accumulation of static electricity carried by the cartridge assembly.

2. Description Relative to the Prior Art

A conventional cartridge, such as used with this invention, includes a magnetic disk rotatably disposed within a dual-sided jacket. The magnetic disk has a central hub that is revealed to drive apparatus through a central opening in both sides of the jacket. The jacket further contains two aligned windows through which a magnetic transducer may extend for magnetically interfacing with either surface of the disk as the disk is rotatably driven. A liner is ordinarily provided on the inner surfaces of the jacket adjacent the disk for reducing friction between the jacket and the disk and for capturing contaminants on the disk. In addition, the liner has an irregular surface which reduces the tendency of the disk to adhere to the plastic jacket when a static charge is present on the jacket.

A plastic, impact-resistant material, such as acrylonitrile butadiene styrene (ABS), has been found particularly suitable for forming the jacket of a cartridge. Such plastic materials, however, possess very high electrical resistances (e.g., $3.7 \times 10^{15}$ ohms-cm for ABS) and collect large accumulations of static electricity due to normal handling. Such accumulations of static electricity may induce a spurious signal as the static discharges through the transducer. The general approach to this problem has been to provide a conductive element that helps to dissipate or neutralize the charge before it can discharge through the transducer. For instance, in U.S. Pat. No. 4,038,693 an electrically conductive layer is provided on the inside surface of the jacket. As another example, a conductive outrigger is provided on a transducer in U.S. Pat. No. 4,058,846 so as to ground any electrostatic charge on the surface of the disk. The drive apparatus may also be modified, as shown in U.S. Pat. No. 4,040,105, to include an electrically conductive, flexible skirt hung in contact with an outer surface of the jacket for draining off an electrostatic charge accumulation. The skirt lies on the same side of the jacket as does the transducer so as to be particularly effective in diverting or intercepting charge before it reaches the transducer and produces a spurious signal.

These approaches to static elimination are incorporated in systems employing a magnetic interface that requires either a pair of abbutting transducers or a pressure pad opposite a single transducer in order to maintain contact between the operating transducer and the disk. Unlike these approaches, the object of the present invention is to neutralize an accumulation of static on a cartridge assembly used in a single-sided interface, that is, a system in which the disk is aerodynamically drawn to the transducer without the intervention of a pressure pad or an opposing transducer. Static presents a special problem in relation to such a system. In particular, an accumulation of static will attract the disk to the inner surface of the jacket opposite the transducer. Often the attractive electrostatic forces are sufficient to overcome the aerodynamic coupling forces and the disk pulls away from the transducer and, in the worst case, sticks to the inner surface of the jacket opposite the transducer. The anti-static solutions heretofore disclosed are not designed to operate in such an interface.

SUMMARY OF THE INVENTION

The electrostatic forces generated by the accumulation of static on the cartridge assembly are effectively neutralized, thus allowing aerodynamic forces to operate, by bringing an anti-static member into close relation with the cartridge assembly. The member itself produces little or no static charge when positioned nearby the cartridge assembly in the drive apparatus. The member includes a substantially flat surface area that covers a substantial proportion of the jacket surface outward of the interface, that is, opposite to the side of the cartridge assembly through which the transducer extends. It is believed that an opposite charge is induced on the surface of the member nearby the jacket that cancels or neutralizes the static charge on the jacket. The disk, consequently, is freed of the electrostatic attraction and, in the worst case, releases from the inner surface of the jacket. The charge, however, is not transferred to the member but is retained on the jacket. Despite the continued presence of the electrostatic charge on the jacket, the attractive field is neutralized as long as the anti-static member is nearby. Aerodynamic forces thus prevail over the neutralized charge and a magnetic interface is maintained between the rotating disk and the transducer. Intimate contact between the anti-static member and the cartridge assembly is assured by resiliently urging the member against the jacket. In the preferred embodiment, the anti-static member is a conductive plate that is resiliently urged against the jacket. This is done by a plurality of leaf springs that, at one end, are attached to a carriage holding the cartridge assembly and, at the other end, bear against the plate.

BRIEF DESCRIPTION OF THE DRAWINGS

The invention will be described in relation to the drawings, in which:

FIGS. 2A and 2B show a portion of a disk drive including the anti-static plate of the invention and a pivotable carriage supporting the cartridge assembly in spaced relationship (FIG. 2A) to a spindle drive motor and in engagement (FIG. 2B) with the drive motor;

FIGS. 3A and 3B are sections taken of the disk drive of FIGS. 2A and 2B, respectively;

FIG. 5 is a section across the top of the cartridge shown in FIG. 4, further showing it in place against the drive motor and a transducer.

DETAILED DESCRIPTION OF THE PREFERRED EMBODIMENT

Figure 1:
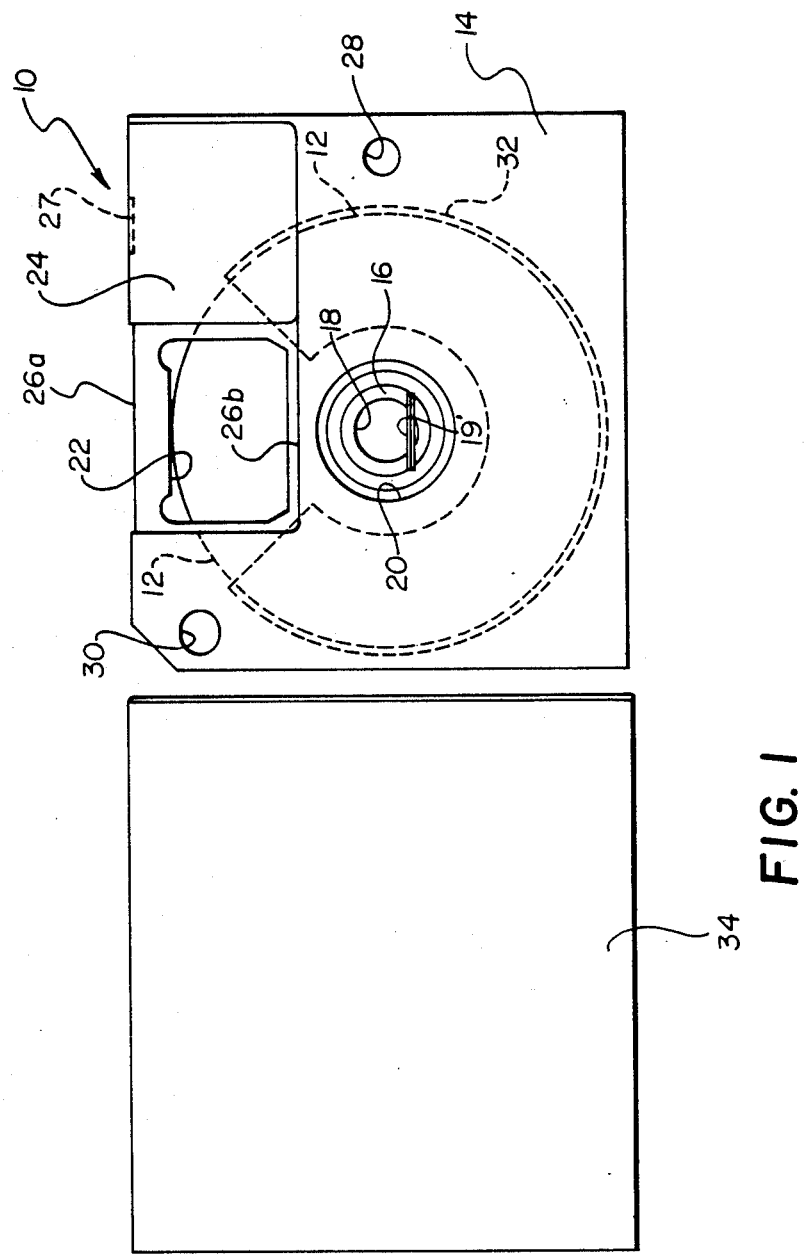
FIG. 1 is an illustration of a cartridge assembly showing a disk, a plastic jacket, and a sleeve for storing the cartridge.

The cartridge assembly 10 shown in FIG. 1 comprises a flexible magnetic disk 12 disposed within a plastic jacket 14. A central hub 16 is fastened to the center of the disk and provides an annular surface 18 and a resilient member 19 for seating a rotatable drive mechanism (not shown in FIG. 1). The jacket 14 contains a central opening 20 for revealing the hub 16 to the drive mechanism. The jacket 14 further contains a window 22 through which a magnetic transducer (not shown in FIG. 1) extends to contact the disk 12. A shutter 24 slides on tracks 26a and 26b for controlling access to the window 22. The shutter 24 has a notch 27 on its top surface which serves as a catch for moving the window 22 across the tracks 26a and 26b. Alignment holes 28 and 30 are provided for engaging alignment pins (not shown in FIG. 1) that locate the cartridge assembly 10 with respect to the drive mechanism. Liner material 32 is provided on each inside surface of the jacket 14 facing the disk 12 in order to diminish the effect of static electricity upon the operation of the cartridge assembly 10. The cartridge assembly 10 is stored in a plastic sleeve 34, which preferably includes a conductive material in its composition so that little static charge is produced as the cartridge assembly 10 is placed into, or removed from, the sleeve 34. Moreover, the disk 12 can be made of a conductive medium to discourage static accumulation on the disk surface.

The remaining figures show only those parts of a disk drive necessary for illustrating the invention and its operation. In FIGS. 2A and 2B, an overhead view of a disk drive is shown. The cartridge assembly 10 is moved according to an arrow 40 into a movable carriage 42. The carriage 42 includes flanged edges 43a and 43b (see also FIGS. 3A and 3B) for supporting the cartridge assembly upright in relation to a fixed frame 46 on which a drive motor 48 and a pair of alignment pins 50 and 52 are mounted. The carriage 42 is supported in spaced relationship with the frame 46 by common attachment through a pivot axis 53. The force initiating the pivot, which itself is not of particular importance and may take many forms, is symbolically represented by an arrow 53a. The pins 50 and 52 are disposed so that when the carriage is pivoted toward the frame 46 (FIG. 2B) the pins penetrate the alignment holes 28 and 30 in the jacket 14. In this position, the respective shoulder sections 50a and 52a of the pins 50 and 52 seat against the outer surface of the jacket 14. In addition, a motor spindle 48a on the motor 48 seats inside the surface 18 of the hub 16, distending the resilient member 19, in preparation for rotatably driving the disk 12. An alignment post 54 (see FIGS. 3A and 3B) positioned generally below the alignment pin 50 (relative to the view in FIG. 2A) provides further support for the jacket 14 as the carriage 42 moves into contact with the frame 46. A bracket 55 on the top of the carriage 42 holds the shutter 24 open as the cartridge assembly 10 is inserted into the carriage 42 and engages the notch 27 for closing the shutter 24 as the cartridge assembly 20 is removed.

As shown in the overhead views of FIGS. 2A and 2B, an anti-static plate 56 is supported in the carriage 42 in relation to the jacket 14 so that it is adjacent to a jacket surface 14a. The surface 14a is situated opposite the window 22 through which a transducer extends into the cartridge assembly 10. The effectiveness of the plate 56 varies in relation to its spacing from the jacket surface 14a and to the severity of the accumulated charge. The plate 56 thus is useful in neutralizing the accumulation of static electricity whether the plate 56 physically contacts the jacket 14 or is slightly spaced from the jacket 14. Intimate contact is nonetheless preferred. As will be described in relation to the preferred embodiment and shown in connection with FIGS. 4 and 5, the plate 56 is resiliently supported in the carriage 42 so that it intimately associates with the jacket surface 14a. Sufficient clearance, however, is allowed for the initial insertion of the cartridge assembly 10 (as shown in FIG. 2A) in loose contact with the plate 56. In this connection, a lip 56a on the plate 56 cooperates with a lip 42a on the carriage 42 and the flanges 43a and 43b to facilitate insertion of the cartridge assembly 10.

As the carriage 42 is pivoted toward the frame 46, contact between the pins 50 and 52, the post 54 and the jacket 14, as well the seating action of the hub 16 upon the drive spindle 48a, forces the cartridge assembly 10 backwards against the plate 56 (as shown best by the spacing 58 in FIG. 3B). Since the plate 56 itself is resiliently supported, the plate 56 also retracts slightly backwards thus assuring intimate contact between the surface 14a and the plate 56. In the preferred embodiment shown in the FIGS., the plate 56 is formed of a metallic material. The apparent requirement, however, is only that the anti-static plate produces little or no static charge when in contact with the jacket surface 14a and the carriage 42. A wooden plate, for instance, functioned successfully during experimentation. While the plate 56 is grounded to the chassis of the drive apparatus in the actual embodiment, this is apparently unnecessary, since an ungrounded metallic plate (as well as the wooden plate) functioned successfully during experimentation.

The frame 46 also supports a transducer 60 (best shown in FIGS. 4 and 5) in radial alignment with the motor spindle 48a. Though not specially shown in the Figures, the transducer 60 is supported for movement radially of the disk 12 over a plurality of separate track positions. The transducer 60 is mounted relative to the disk 12, as shown by U.S. Pat. Nos. 4,578,727 and 4,620,250, so that aerodynamic forces urge a surface of the disk 12 into contact with a transducing surface of the transducer 60. U.S. Pat. No. 4,578,727 discloses a single-sided contact recording device that achieves a stable, constant interface between a moving disk and a magnetic transducer without the necessity of backing the disk with a pressure pad. Such a stable interface is established by surrounding the surface of the transducer with a small, flat air bearing surface (shown by the oval 61 in FIG. 4). The transducer is supported in an opening in the air bearing surface. When the disk is rotated at relatively high speeds, a negative pressure is formed in a cavity below the opening that pulls a nearby section of the rotated disk into contact with the surface of the transducer, thereby ensuring a constant interface for effective magnetic coupling. In companion U.S. Pat. No. 4,620,250, the air bearing surface is disposed at an angle with respect to the disk so that a leading edge of the air bearing surface penetrates slightly into the nominal plane of the rotating disk. This is believed to assist in the formation of strong coupling forces along the air bearing surface. The disclosures of both U.S. Pat. Nos. 4,578,727 and 4,620,250 are incorporated by reference into the present patent.

As mentioned before, static electricity tends to accumulate on the jacket 14 during normal handling of the cartridge assembly 10 and as the disk 12 rotates. If the accumulation is sufficient, the disk 12 breaks contact with the transducer 60 and the magnetic interface is consequently interrupted. A signal loss from the transducer 60 is thus experienced. The disk 12, in fact, is usually found (after rotation is stopped) to be sticking to the inside of the surface 14a of the jacket 14 opposite to the transducer 60. This accumulation of static electricity is neutralized according to the invention by providing the plate 56 in close proximity with the outside of the surface 14a of the jacket 14. The plate 56 changes the static electrical field in such a manner as to reduce the influence of the static field on the disk 12 and to thus allow the disk 12 to be aerodynamically captured by the transducer 60.

Figure 4:
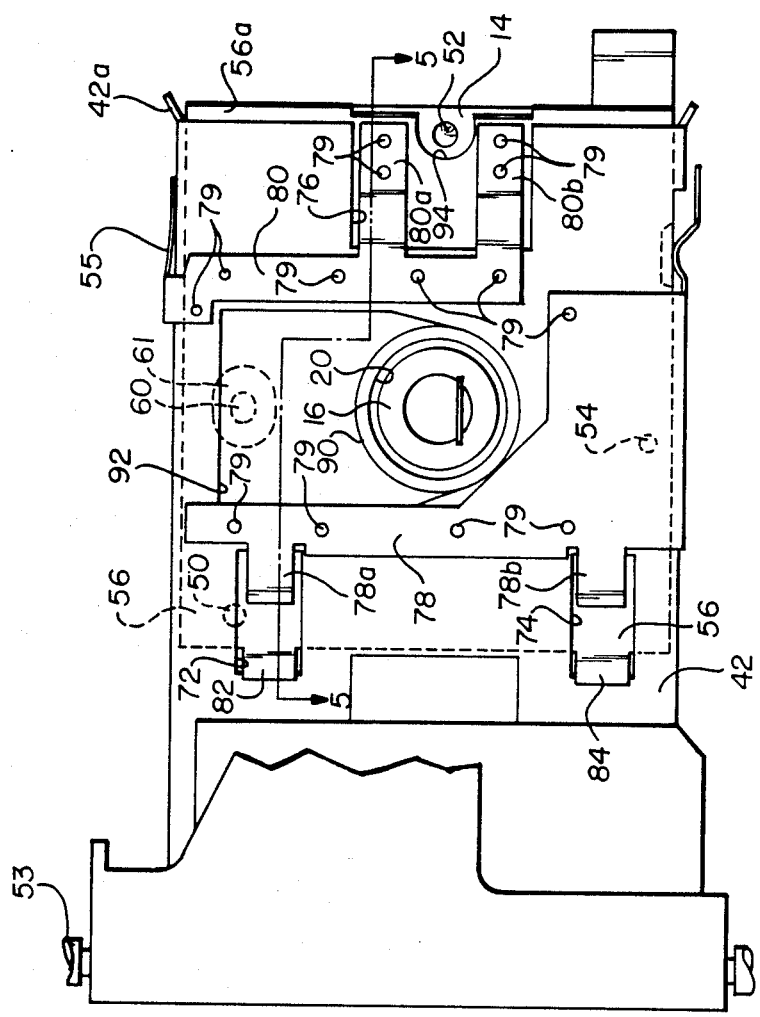
FIG. 4 is a side elevation of the pivotable carriage, showing the anti-static plate in more detail.

Further details of the plate 56 and its mounting to the carriage 42 are shown in FIGS. 4 and 5. The basic implementation is a spring interlinkage between the carriage 42 and the plate 56. Portions of the carriage 42 are removed, leaving the openings 72, 74 and 76. Leaf springs 78 and 80 are spot-welded (for instance, at weld locations 79) to the carriage 42 over the openings 72, 74 and 76. More specifically, the spring 78 has two load-bearing arms 78a and 78b entering respective openings 72 and 74 and contacting the plate 56. The arms 78a and 78b are thrust against and slide upon the plate 56. The spring 80 has two load-bearing arms 80a and 80b spot-welded to the plate 56 (at locations 79). The plate 56 has a pair of tabs 82 and 84 bent backwardly over respective edges of the openings 72 and 74. The spot-welds and the tabs 82 and 84, as well as the freely-sliding arms 78a and 78b, generally allow the plate 56 to retract and slide against the arms 78a and 78b under spring pressure as the jacket 14 is thrust upon the alignment pins 50 and 52 and the post 54. This insures intimate contact between the jacket 14 and the anti-static plate 56 as the carriage 42 is pivoted into an operating position relative to the frame 46.

As shown in FIG. 4, the plate 56 has a central area 90 removed to reveal the hub 16 of the disk 12. The carriage 42 likewise has an opening 92 to reveal the area 90 and the hub 16 to ancillary apparatus (not shown) in the drive mechanism. In addition, an outside area 94 of the plate 56 is removed so as to provide clearance for the end of the alignment pin 52. (The other alignment pin 50 is shortened so as not to pass completely through the alignment hole 28.) Despite the removed areas, the plate 56 includes an area that is generally coextensive with the surface 14a of the jacket 14. In the preferred embodiment, inasmuch as the plate 56 provides support for the cartridge assembly 10, the plate 56 covers substantially the entire surface area 14a of the jacket 14. It is believed likely, nonetheless, that coverage of a smaller area will be sufficient to overcome the static field for static accumulations of less severity.

The invention has been described in detail with particular reference to a presently preferred embodiment, but it will be understood that variations and modifications can be effected within the spirit and scope of the invention. For instance, while the anti-static element has been described as a plate 56, it should be clear that other shapes may be appropriate as long as the member has a substantially flat surface on a side thereof that can be associated with the jacket surface 14a. Furthermore, it may prove helpful to have an additional anti-static plate on the other side of the jacket 14 to neutralize charge that may have settled on that side of the cartridge assembly.

What is claimed is:

1. In disk drive apparatus of the type that uses a cartridge assembly including a flexible magnetic disk and a dual-sided plastic jacket enclosing the disk, the drive apparatus including (a) a transducer disposed to extend through a window in the jacket on a windowed side thereof and magnetically interface with the disk by means of aerodynamic forces generated as the disk rotates nearby the transducer and (b) a carriage for bringing the cartridge assembly into transducing relationship with the transducer, the improvement wherein the drive apparatus comprises:
   a conductive, flat-surfaced plate substantially corresponding in size to the cartridge assembly; and
   means attached to the carriage for resiliently loading said plate against the cartridge assembly opposite to said windowed side thereof so that the flat-surfaced area of said plate is substantially coextensive with the jacket.

2. Apparatus as claimed in claim 1 in which said conductive plate is a metal plate.

3. Apparatus as claimed in claim 2 in which said resiliently loading means comprises a leaf spring interlinking the carriage and said plate, the cartridge assembly being urged into contact with said plate against the resilient force of said leaf spring when the cartridge assembly is brought into transducing relationship with the transducer.

4. In a disk drive apparatus of the type that uses a cartridge assembly including a flexible magnetic disk and a plastic jacket enclosing the disk, the plastic jacket supporting an unwanted static electrical charge that is generated during handling of the cartridge assembly, the drive apparatus including (a) a stationary frame for supporting a drive motor, a transducer, and alignment members for positioning the cartridge assembly in relation to the drive motor and the transducer, the transducer extending through a window in the jacket for magnetically interfacing with the disk on one side thereof by means of aerodynamic forces generated as the disk rotates nearby the transducer and (b) a pivotable carriage supported in spaced relationship to the frame for engaging the cartridge assembly with the drive motor, the transducer and the alignment members, the improvement wherein the disk drive apparatus comprises:
   a conductive, anti-static plate having a surface area substantially coextensive with the jacket surface of the cartridge assembly;
   resilient spring means interlinking the carriage and said plate; and
   means for moving the carriage toward the frame until the alignment members force the cartridge assembly into intimate contact with the surface area of said plate and against the opposing force of said resilient means, whereby said plate is urged into contact with the jacket of the cartridge assembly and the static electrical charge is effectively neutralized to thus allow the disk to be aerodynamically captured by the transducer.

* * * * *